(12) United States Patent
Wan et al.

(10) Patent No.: US 10,437,025 B2
(45) Date of Patent: Oct. 8, 2019

(54) WAFER-LEVEL LENS PACKAGING METHODS, AND ASSOCIATED LENS ASSEMBLIES AND CAMERA MODULES

(71) Applicant: OmniVision Technologies, Inc., Santa Clara, CA (US)

(72) Inventors: Tsung-Wei Wan, HsinChu (TW); Wei-Ping Chen, New Taipei (TW); Jui-Yi Chiu, Zhubei (TW); Jau-Jan Deng, Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 69 days.

(21) Appl. No.: 14/605,298

(22) Filed: Jan. 26, 2015

(65) Prior Publication Data
US 2016/0216493 A1    Jul. 28, 2016

(51) Int. Cl.
| | |
|---|---|
| *G02B 13/00* | (2006.01) |
| *B29D 11/00* | (2006.01) |
| *B29C 45/00* | (2006.01) |
| *B29C 45/14* | (2006.01) |
| *B29L 11/00* | (2006.01) |

(52) U.S. Cl.
CPC ...... *G02B 13/0085* (2013.01); *B29C 45/0053* (2013.01); *B29C 45/14336* (2013.01); *B29C 45/14778* (2013.01); *B29D 11/00807* (2013.01); *B29C 2045/14868* (2013.01); *B29D 11/00307* (2013.01); *B29L 2011/0016* (2013.01)

(58) Field of Classification Search
USPC .......................................... 348/340; 359/819
See application file for complete search history.

(56) References Cited

U.S. PATENT DOCUMENTS

| | | |
|---|---|---|
| 2005/0275051 A1 | 12/2005 | Farnworth et al. |
| 2006/0035415 A1 | 2/2006 | Wood et al. |

(Continued)

FOREIGN PATENT DOCUMENTS

| | | |
|---|---|---|
| TW | 200937642 A | 9/2009 |
| TW | 201004325 A | 1/2010 |

(Continued)

OTHER PUBLICATIONS

U.S. Appl. No. 14/932,075, Office Action dated Oct. 6, 2016, 11 pages.

(Continued)

*Primary Examiner* — William R Alexander
*Assistant Examiner* — Gary W O'Neill
(74) *Attorney, Agent, or Firm* — Lathrop Gage LLP

(57) ABSTRACT

A method for packaging applies to packaging a plurality of wafer-level lenses. Each wafer-level lens includes (a) a substrate with opposite facing first and second surfaces and (b) a respective lens element on at least one of the first and second surfaces. Each lens element has a lens surface facing away from the substrate. The method includes partially encasing the plurality of wafer-level lenses with a housing material to produce a wafer of packaged wafer-level lenses. In the wafer of packaged wafer-level lenses, the housing material supports each of the plurality of wafer-level lenses by contacting the respective substrate, and the housing is shaped to form a plurality of housings for the plurality of wafer-level lenses, respectively.

22 Claims, 8 Drawing Sheets

(56) References Cited

U.S. PATENT DOCUMENTS

| | | | |
|---|---|---|---|
| 2006/0132644 A1 | 6/2006 | Shangguan et al. | |
| 2010/0129954 A1 | 5/2010 | Kong | |
| 2011/0013292 A1* | 1/2011 | Rossi | H01L 27/14621 359/738 |
| 2011/0037886 A1* | 2/2011 | Singh | G02B 13/0085 348/340 |
| 2011/0260345 A1* | 10/2011 | Deng | H01L 27/14618 264/1.7 |
| 2012/0242814 A1* | 9/2012 | Kubala | B26F 1/38 348/76 |
| 2013/0308212 A1* | 11/2013 | Kubala | G02B 13/146 359/819 |
| 2015/0036046 A1* | 2/2015 | Rudmann | H04N 5/2252 348/374 |

FOREIGN PATENT DOCUMENTS

| | | |
|---|---|---|
| TW | 201136738 A | 11/2011 |
| WO | 2009/076788 A1 | 6/2009 |

OTHER PUBLICATIONS

Office Action corresponding to Taiwanese Patent Application No. 105102405, dated Sep. 7, 2017, with English translation, 11 pages.
Office Action corresponding to Taiwanese Patent Application No. 105133778, dated Nov. 5, 2017, with English translation, 12 pages.
Office Action corresponding to Taiwanese Patent Application No. 105102405, dated Jun. 2, 2017—with English translation, 26 pages.
Office Action corresponding to U.S. Appl. No. 14/932,075, dated Apr. 21, 2017, 14 pages.
Non-Final Rejection in U.S. Appl. No. 14/932,075 dated Mar. 1, 2018, 12 pages.
Non-Final Rejection in U.S. Appl. No. 14/932,075 dated Jul. 13, 2018, 13 pages.
Non-Final Rejection in U.S. Appl. No. 14/932,075 dated Nov. 29, 2018, 10 pages.
Taiwan Patent Application No. 105133778, English translation of Office Action dated Mar. 12, 2019, 3 pages.

* cited by examiner

400

FORM WAFER OF PACKAGED WAFER-LEVEL LENSES BY PARTIALLY ENCASING A PLURALITY OF WAFER-LEVEL LENSES IN A HOUSING MATERIAL, OPTIONALLY OPAQUE, SUCH THAT THE HOUSING MATERIAL FORMS A HOUSING MATERIAL FOR EACH WAFER-LEVEL LENS
410

SHAPE THE HOUSING MATERIAL SUCH THAT IT SUPPORTS THE WAFER-LEVEL LENSES BY CONTACTING THE SUBSTRATES
412

▼

DICE WAFER OF PACKAGED WAFER-LEVEL LENSES TO FORM A PLURALITY OF PACKAGED WAFER-LEVEL LENS ASSEMBLIES
420

| DICE WAFER TO PRODUCE PACKAGED WAFER-LEVEL LENS ASSEMBLIES, EACH HAVING A SINGLE WAFER-LEVEL LENS 422 | DICE WAFER TO PRODUCE PACKAGED WAFER-LEVEL LENS ASSEMBLIES, EACH HAVING MULTIPLE WAFER-LEVEL LENSES 424 |
|---|---|

BOND AT LEAST ONE WAFER-LEVEL LENS ASSEMBLY TO IMAGE SENSOR MODULE
430

| BOND PACKAGED WAFER-LEVEL LENS ASSEMBLY TO AN IMAGE SENSOR TO FORM A CAMERA MODULE 432 | BOND PACKAGED WAFER-LEVEL LENS ASSEMBLY TO AN IMAGE SENSOR ARRAY TO FORM AN ARRAY CAMERA MODULE 434 |
|---|---|

FIG. 4

WAFER-LEVEL LENS PACKAGING METHODS, AND ASSOCIATED LENS ASSEMBLIES AND CAMERA MODULES

BACKGROUND

Cameras are incorporated into a wide range of devices. For example, widely used consumer electronics devices, such as phones, tablets, and laptops, include a camera. To comply with the targeted cost for such devices, the camera must be manufactured at very low cost. The manufacturing cost of a typical camera module is composed of (a) cost of materials, such as cost of the image sensor, the lens material, and the packaging material, and (b) cost packaging (including assembly). In many cases, the cost of packaging is significant and may even exceed the cost of materials. For example, both of image sensors and lenses may be inexpensively produced at the wafer-level, while the process of aligning the lens with the image sensor and the process of constructing a light-tight housing (apart from the viewing port) for the camera module are non-wafer-level processes that contribute to the total cost of a camera module in a non-negligible fashion.

Array cameras, such as stereo cameras, have significant market potential not only in consumer electronics but also in the automotive and machine vision industries. In an array camera, each lens must be aligned to its corresponding image sensor, and each individual camera of the array camera must be light-tight such that there is no interference from unwanted external light and such that there is no cross-talk between individual cameras. The process of packaging array cameras is therefore particularly costly.

SUMMARY

In an embodiment, a method for packaging applies to packaging a plurality of wafer-level lenses. Each wafer-level lens includes (a) a substrate with opposite facing first and second surfaces and (b) a respective lens element on at least one of the first and second surfaces. Each lens element has a lens surface facing away from the substrate. The method includes partially encasing the plurality of wafer-level lenses with a housing material to produce a wafer of packaged wafer-level lenses. In the wafer of packaged wafer-level lenses, the housing material supports each of the plurality of wafer-level lenses by contacting the respective substrate, and the housing is shaped to form a plurality of housings for the plurality of wafer-level lenses, respectively.

In an embodiment, a lens assembly includes a wafer-level lens with (a) a substrate with opposite facing first and second surfaces and (b) a respective lens element on at least one of the first and second surfaces. Each lens element has a lens surface facing away from the substrate. The lens assembly further includes an integrally formed housing that contacts the substrate and extends inwards toward the optical axis of the wafer-level lens along both the first surface and the second surface.

BRIEF DESCRIPTION OF THE DRAWINGS

FIG. 4 is a flowchart for the method of FIG. 1, according to an embodiment.

DETAILED DESCRIPTION OF THE EMBODIMENTS

Figure 1:
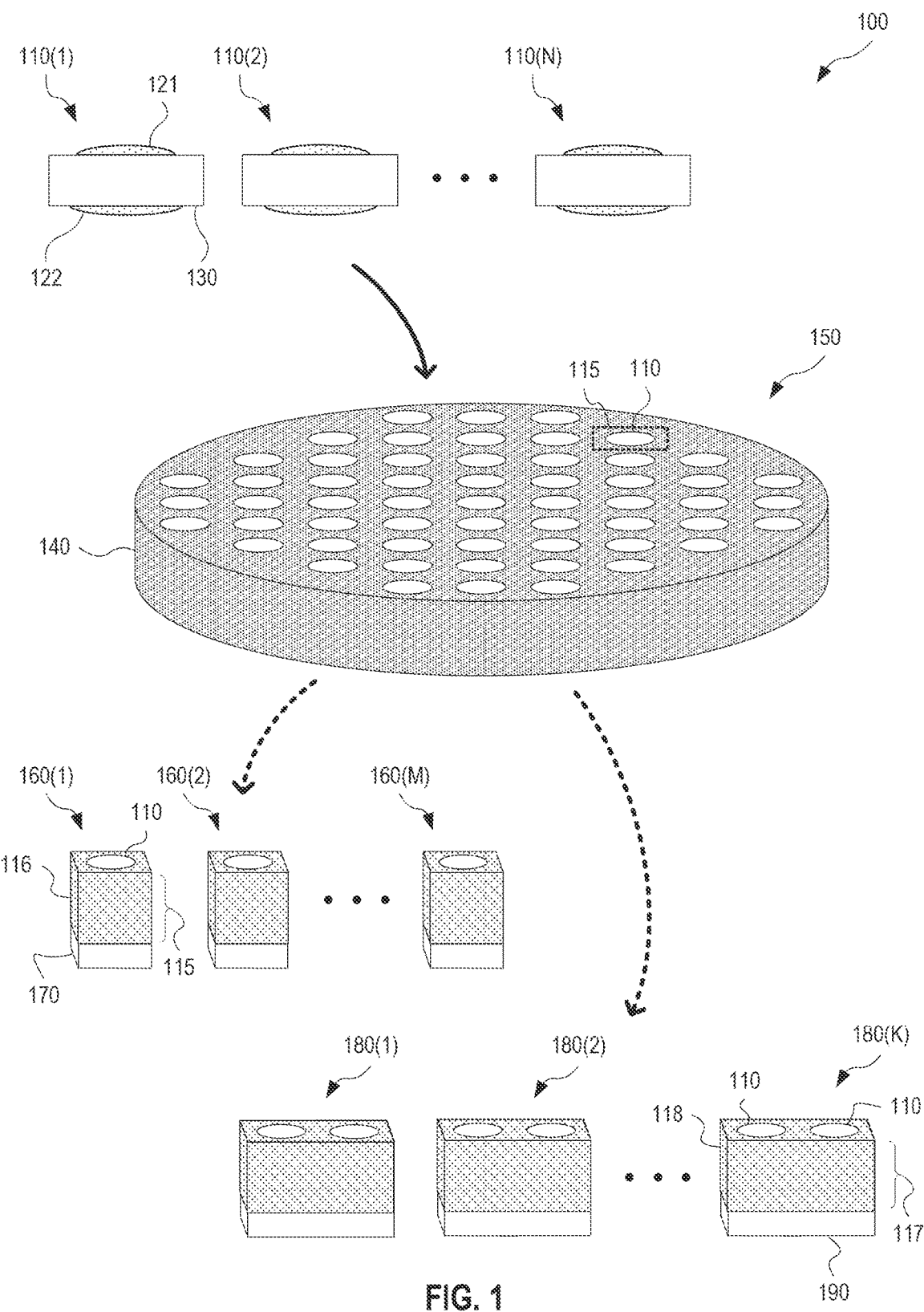
FIG. 1 illustrates a method for packaging a plurality of wafer-level lenses, according to an embodiment.

FIG. 1 illustrates one exemplary method 100 for packaging a plurality of wafer-level lenses 110. Each wafer-level lens 110 includes two lens elements 121 and 122 formed on two opposite facing surfaces of a substrate 130. Substrate 130 is at least partially transmissive to light in a wavelength range of interest. In method 100, the plurality of wafer-level lenses 110 are partially encased by housing material 140 to form a wafer 150 of packaged wafer-level lenses 115. Wafer 150 is integrally formed around the plurality of wafer-level lenses 110, such that housing material 140 forms a housing 116 for each of wafer-level lenses 110. Thus, wafer 150 may be diced to produce a plurality of packaged wafer-level lens 115, each composed of a wafer-level lens 110 and a housing 116 therefor.

Through production of wafer 150, method 100 facilitates simplified alignment of wafer-level lenses 110 with image sensors to form camera modules. In certain embodiments, housing material 140 is opaque. Herein, "opaque" refers to being substantially opaque to light of wavelength in a wavelength range of interest, such as the wavelength range to which an associated image sensor is sensitive. In such embodiments, the production of wafer 150 inherently provides light-tight housings for each wafer-level lens 110. Accordingly, method 100 facilitates simplified packaging of camera modules, as compared to prior art methods.

Method 100 allows for shaping housing material 140 of wafer 150 such that packaged wafer-level lens 115 may easily be assembled with an image sensor 170 to produce a camera module 160. Image sensor 170 captures an image formed thereon by wafer-level lens 110. In one implementation of method 100, housing material 140 of wafer 150 is shaped such that packaged wafer-level lens 115 may be mounted directly to image sensor 170 by bonding housing 116 onto image sensor 170. In one example, housing material 140 of wafer 150 is shaped such that housing 116 ensures proper alignment of packaged wafer-level lens 115 with respect to image sensor 170.

In one embodiment of method 100, wafer 150 is diced to singulate individual packaged wafer-level lenses 115. In this embodiment, method 100 may include mounting a plurality of individual packaged wafer-level lenses 115 to a respective plurality of image sensor 170 to form a plurality of camera modules 160.

In another embodiment, wafer 150 is diced to singulate arrays 117 of packaged wafer-level lenses 115, each array 117 having a housing 118 formed from housing material 140. In this embodiment, method 100 may include mounting a plurality of such arrays 117 to a respective plurality of image sensor arrays 190 to form a plurality of array camera modules 180. The number of image sensors within each image sensor array 190 matches the number of wafer-level lenses 110 within each array 117. In one implementation of this embodiment, housing material 140 of wafer 150 is shaped such that array 117 may be mounted directly to image sensor array 190 by bonding housing 118 onto image sensor array 190. In one example, housing material 140 of wafer 150 is shaped such that housing 118 ensures proper alignment of packaged wafer-level lens 115 with respect to image sensor array 190.

Without departing from the scope hereof, array 117 may include more than two wafer-level lenses 110, and array camera module 180 may include more than two individual cameras. Additionally, lens elements 121 and 122 may have shape different from those illustrated in FIG. 1, without departing from the scope hereof.

Figure 2:
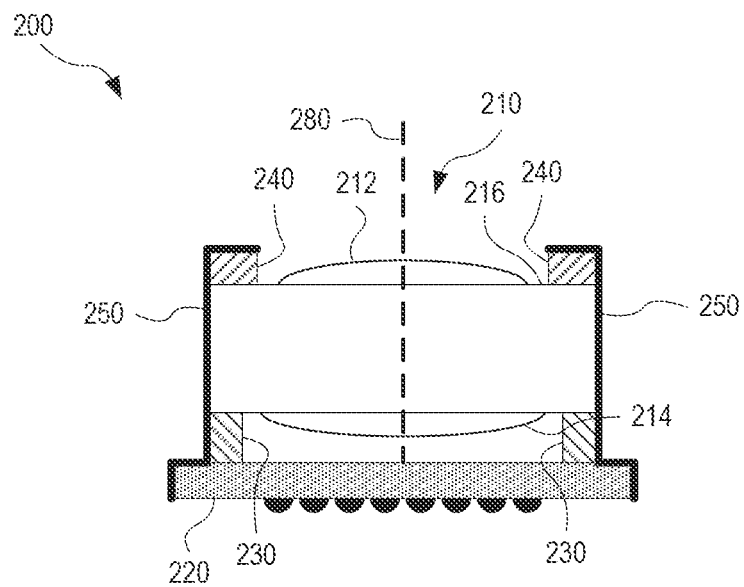
FIG. 2 illustrates a prior art camera module.

FIG. 2 illustrates a prior art camera module 200. Prior art camera module 200 includes an image sensor 220 and a wafer-level lens 210 composed of a substrate 216 and two lens elements 212 and 214. Prior art camera module 200 further includes a bottom spacer 230 for mounting wafer-level lens 210 onto image sensor 220 with a pre-specified spacing between wafer-level lens 210 and image sensor 220. Typically, the pre-specified spacing is a spacing required for wafer-level lens 210 and image sensor 200 to work together to serve a certain purpose, for example to function as a camera module. Additionally, prior art camera module 200 includes a top spacer 240 and a black coating 250. Black coating 250 blocks at least a portion of unwanted light propagating toward image sensor 220, i.e., light that is not properly imaged onto image sensor 220 by wafer-level lens 210. Top spacer 240 serves as a platform for depositing black coating 250 to block light propagating toward wafer-level lens 210 at angles, relative to optical axis 280 of wafer-level lens 210, greater than the desired angles.

Prior art camera module 200 is formed by (a) aligning wafer-level lens 210 (and bottom spacer 230 and top spacer 240) with respect to image sensor 220, (b) bonding bottom spacer 230, wafer-level lens 210, and top spacer 240 to image sensor 220, and (c) depositing black coating 250. The process of depositing black coating 250 includes either avoiding deposition of black coating 250 on lens element 212 or removing black coating 250 from lens element 212.

As will be discussed further below in reference to FIGS. 6-9, method 100 reduces the number of bonding steps required to form a camera module based upon a wafer-level lens, since equivalents of bottom spacer 230 and top spacer 240 are integrally formed by shaping housing material 140 to form wafer 150. In addition, since housing material 140 may be opaque, method 100 does not require a separate process step of depositing black coating 250. Furthermore, method 100 may shape housing material 140 such that the shape of housing 116 inherently ensures proper alignment of packaged wafer-level lens 115 with respect to image sensor 170.

Figure 3:
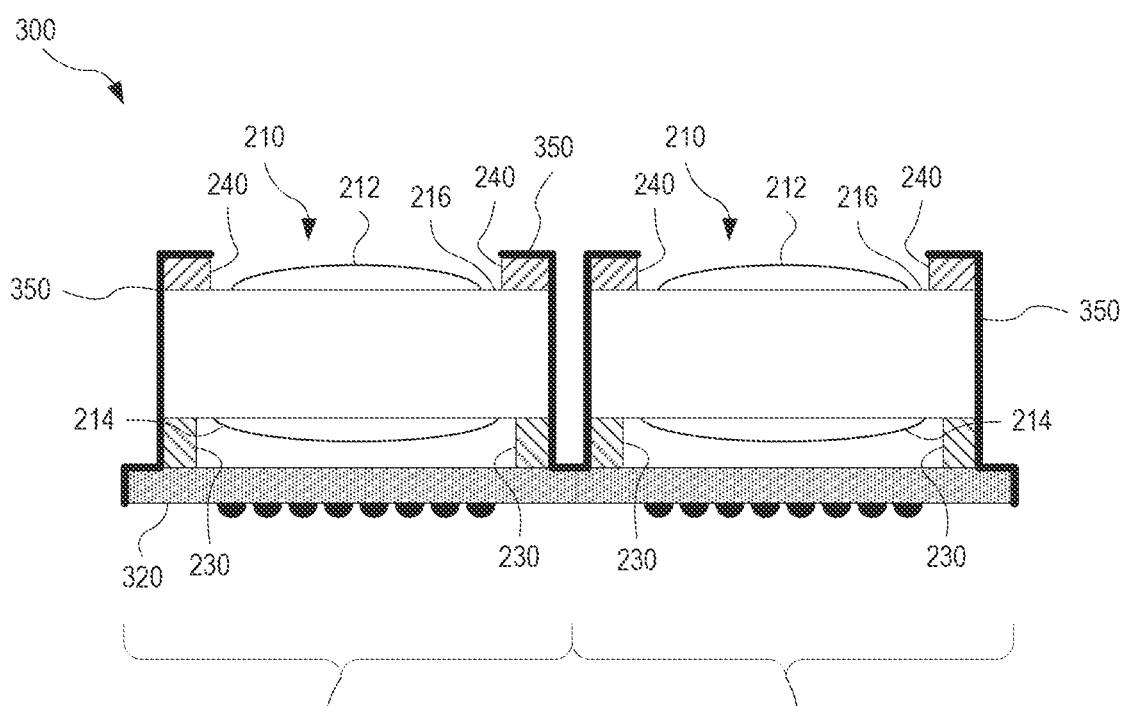
FIG. 3 illustrates a prior art array camera module.

FIG. 3 illustrates a prior art array camera module 300 with two individual cameras 302. Prior art array camera module 300 is an extension of prior art camera module 200 (FIG. 2) to an array camera. Prior art array camera module 300 includes two wafer-level lenses 210 mounted onto an image sensor array 320 using bottom spacers 230. Prior art array camera module 300 further includes top spacers 240 and a black coating 350. Top spacer 240 and black coating 350 serve the same purposes as discussed in reference to FIG. 2. Furthermore, black coating 350 optically isolates cameras 302 from each other. To optically isolate cameras 302 from each other, wafer-level lenses 210 are located a distance apart from each other, and black coating 350 is deposited in between wafer-level lenses 210.

Prior art array camera module 300 is formed by (a) aligning each of wafer-level lenses 210 (and bottom spacers 230 and top spacers 240) with respect to each image sensor of image sensor array 320, (b) bonding bottom spacers 230, wafer-level lenses 210, and top spacers 240 to image sensor array 320, and (c) depositing black coating 350. The process of depositing black coating 350 includes either avoiding deposition of black coating 350 on lens elements 212 or removing black coating 350 from lens elements 312.

As will be discussed further below in reference to FIGS. 6-9, method 100 reduces the number of bonding steps required to form an array camera module based upon wafer-level lenses, since equivalents of bottom spacer 230 and top spacer 240 are integrally formed by shaping housing material 140 to form wafer 150. In addition, since housing material 140 may be opaque, method 100 does not require a separate process step of depositing black coating 350. Furthermore, method 100 may shape housing material 140 such that the shape of housing 118 inherently ensures proper alignment of array 117 with respect to image sensor array 190.

FIG. 4 is a flowchart 400 for method 100 (FIG. 1). In a step 410, method 400 forms wafer 150 of packaged wafer-level lenses 115. Step 410 includes partially encasing a plurality of wafer-level lenses 110 in housing material 140 such that housing material 140 forms a housing 116 for each of the plurality of wafer-level lenses 110. In certain embodiments, housing material 140 is opaque such that housings 116, formed in step 410, are opaque. Step 410 includes a step 412 of shaping housing material 140 such that it supports wafer-level lenses 110 by contacting, for each wafer-level lens 110, substrate 130. Furthermore, step 412 shapes housing material 140 such that each housing 116 has openings for allowing light propagation through the plurality of wafer-level lenses 110.

In an optional step 420, wafer 150 is diced to form a plurality of wafer-level lens assemblies. In one embodiment, each of the plurality of wafer-level lens assemblies is a packaged wafer-level lens 115. In this embodiment, step 420 includes a step 422 of dicing wafer 150 to produce a plurality of packaged wafer-level lenses 115. In another embodiment, each of the plurality of wafer-level lens assemblies is an array 117. In this embodiment, step 420 includes a step 424 of dicing wafer 150 to produce a plurality of arrays 117. In yet another embodiment, the plurality of wafer-level lens assemblies includes both packaged wafer-level lenses 115 and arrays 117. In this embodiment, step 420 applies steps 422 and 424 to mutually different portions of wafer 150. One or both of the mutually different portions may be non-contiguous.

Optionally, method 400 includes a step 430 of bonding at least one of the wafer-level lens assemblies, produced in step 420, to an image sensor module to form a camera module. In embodiments of method 400 that include step 422, the module of step 430 may be image sensor 170 and step 430 may include a step 432. In step 432, at least one packaged wafer-level lens 115 is bonded to image sensor 170 to form at least one respective camera module 160. In embodiments of method 400 that include step 424, the module of step 430 may be image sensor array 190 and step 430 may include a step 434. In step 434, at least one array 117 is bonded to image sensor array 190 to form at least one respective array camera module 180.

Figure 5:
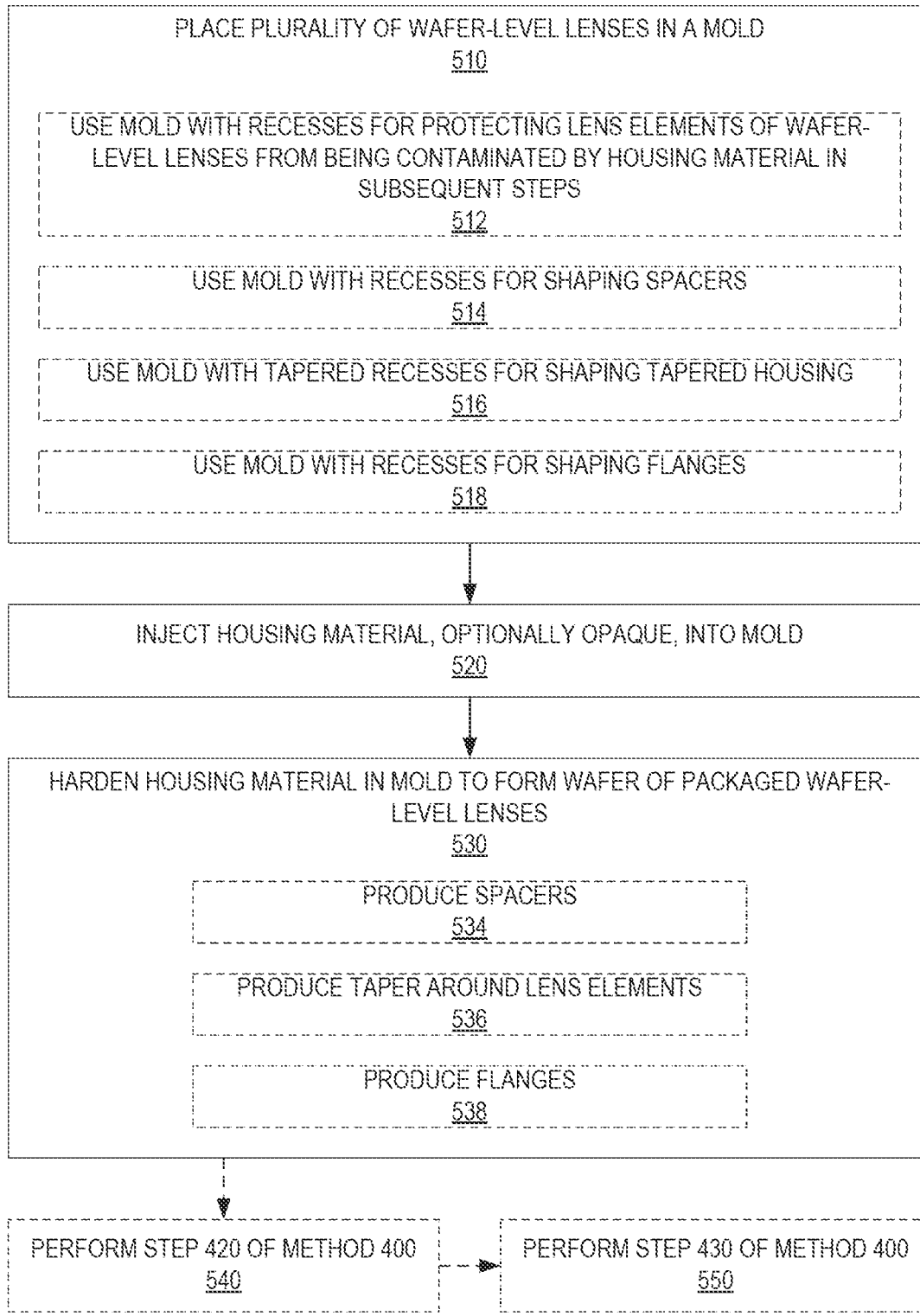
FIG. 5 is a flowchart for another method for packaging a plurality of wafer-level lenses, according to an embodiment.

FIG. 5 is a flowchart illustrating one exemplary injection-molding method 500 for packaging a plurality of wafer-level lenses 110 (FIG. 1). Method 500 is an embodiment of method 400 (FIG. 4).

Figure 6:
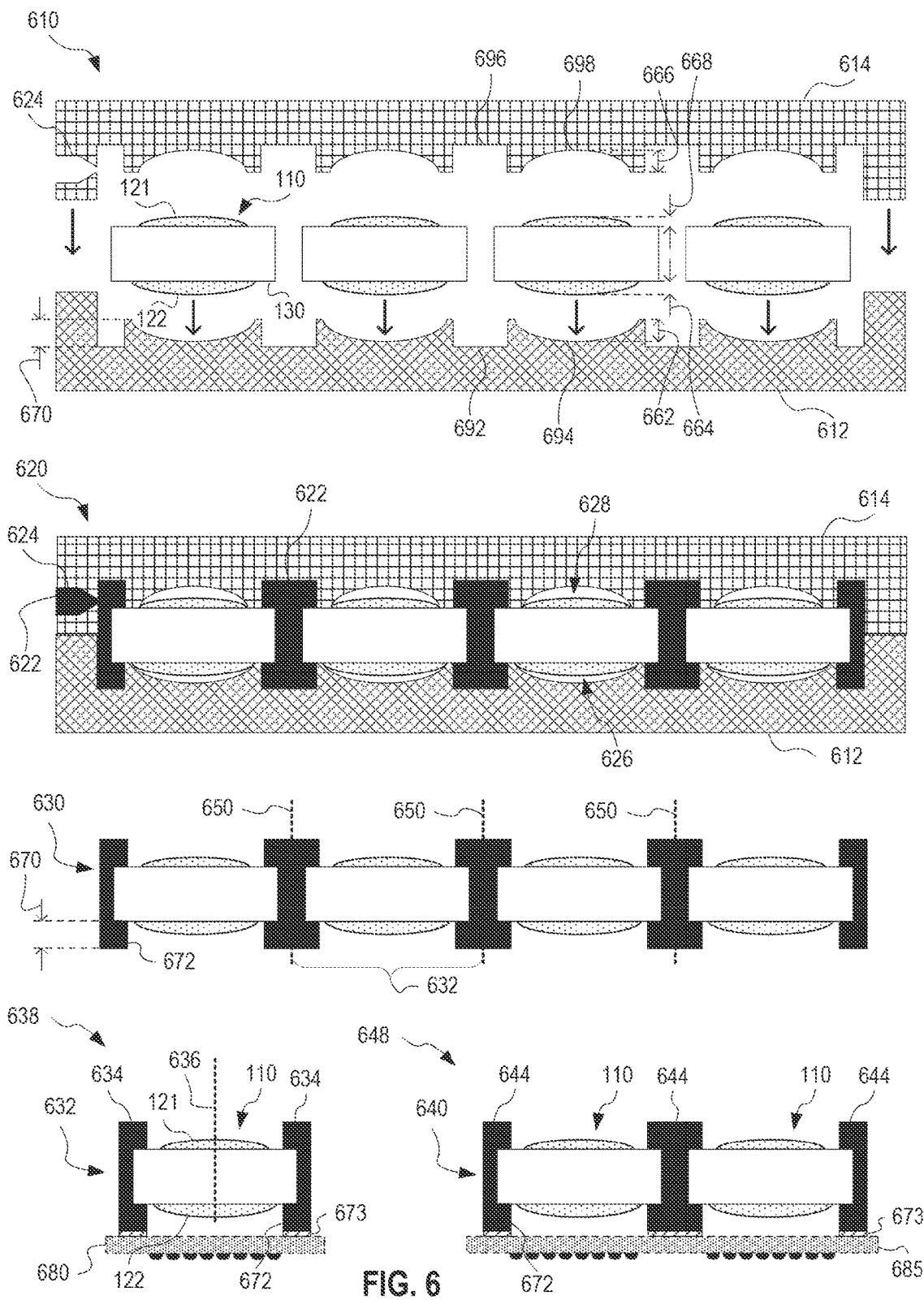
FIG. 6 schematically illustrates certain steps of the method of FIG. 5, as well as wafer-level lens assemblies and camera modules produced therefrom, according to one embodiment.

FIG. 6 schematically illustrates one example of method 500 together with one exemplary wafer 630 of packaged wafer-level lenses produced according to this example of method 500. FIG. 6 further illustrates exemplary wafer-level lens assemblies (packaged wafer-level lens 632 and packaged lens array 640), and camera modules (camera module 638 and array camera module 648) associated with this example of method 500. FIGS. 5 and 6 are best viewed together.

In a step 510, a plurality of wafer-level lenses 110 are placed in a mold. Diagram 610 illustrates one example of step 510. In diagram 610, a plurality of wafer-level lenses 110 are placed in a lower mold piece 612, for example using pick and place technology as known in the art. For clarity of illustration, not all wafer-level lenses 110, not all lens elements 121 and 122, and not all substrates 130 are labeled in FIG. 6. Next, an upper mold piece 614 is closed down on lower mold piece 612. Diagram 620 shows the resulting configuration. Together, lower mold piece 612 and upper mold piece 614 include at least one injection gate 624. Although FIG. 6 shows upper mold piece with a single injection gate 624, and lower mold piece with no injection gate, the actual number of injection gates as well as placement of the injection gate(s) may differ from that shown in FIG. 6 without departing from the scope hereof. Lower mold piece 612 includes recesses 692 for shaping the housing material subsequently injected into the mold composed of lower mold piece 612 and upper mold piece 614. Likewise, upper mold piece 614 includes recesses 696 for shaping the housing material. For clarity of illustration, not all recesses 692 and 696 are labeled in FIG. 6.

Although FIG. 6 shows four wafer-level lenses 110 being placed in lower mold piece 612, lower mold piece 612 and upper mold piece 614 may be configured to accept any number of wafer-level lenses 110. For example, lower mold piece 612 and upper mold piece 614 may be configured to accept tens, hundreds, or thousands of wafer-level lenses 110 to produce wafer 630 with tens, hundreds, or thousands of wafer-level lenses 110.

In an embodiment, step 510 includes a step 512 of using a mold with recesses for protecting lens elements 121 and 122 of each of wafer-level lenses 110 from being contaminated by housing material 140 in subsequent steps of method 500. Diagrams 610 and 620 illustrate one example of step 512. Lower mold piece 612 includes recesses 694 having depth 662. Depth 662 is measured relative to substrate 130 when wafer-level lenses 110 are placed in lower mold piece 612. Depth 662 exceeds the extent 664 of lens element 122 away from substrate 130, such that there is a gap 626 between each recess 694 and associated lens element 122. Lower mold piece 612 contacts substrate 130 along a path that circumnavigates lens element 122 to prevent housing material from entering gap 626. Similarly, upper mold piece 614 includes recesses 698 having depth 666. Depth 666 is measured relative to substrate 130 when upper mold piece 614 is closed down on lower mold piece 612. Depth 666 exceeds the extent 668 of lens element 121 away from substrate 130, such that there is a gap 628 between each recess 698 and associated lens element 121. Upper mold piece 614 contacts substrate 130 along a path that circum- navigates lens element 121 to prevent housing material from entering gap 628. For clarity of illustration, not all recesses 694 and not all recesses 698 are labeled in FIG. 6.

In a step 520, housing material 140 is injected into the mold. Diagram 620 illustrates one example of step 520, wherein an opaque housing material 622 is injected into the mold, consisting of lower mold piece 612 and upper mold piece 614, through injection gate 624 to at least substantially fill recesses 692 and 696.

In a step 530, housing material 140 is hardened in the mold to form wafer 150. Wafer 630 of packaged wafer-level lenses 632 is one exemplary outcome of step 530 based upon the exemplary mold consisting of lower mold piece 612 and upper mold piece 614. Wafer 630 is an embodiment of wafer 150. Each packaged wafer-level lens 632 is an embodiment of packaged wafer-level lens 115 and includes wafer-level lens 110 and some of hardened opaque housing material 622.

Optionally, method 500 includes a step 540 of performing step 420 of method 400 to form a plurality of packaged wafer-level lens assemblies. FIG. 6 illustrates one exemplary packaged wafer-level lens 632 formed in step 540 by dicing wafer 630 along dicing lines 650 according to step 422. FIG. 6 also illustrates one exemplary packaged lens array 640 formed in step 540 by dicing wafer 630 along a true subset of dicing lines 650 according to step 424. Packaged lens array 640 includes two wafer-level lenses 110. Although lower mold piece 612 and upper mold piece 614 are shown in FIG. 6 as producing a wafer 630 that does not requiring dicing at locations along the perimeter thereof, lower mold piece 612 and upper mold piece 614 may be configured to produce wafer 630 with excess material along the perimeter. In this case, dicing lines 650 are included also along the perimeter of wafer 630.

Method 500 may further include a step 550 of performing step 430 of method 400 to form at least one camera module. FIG. 6 illustrates exemplary outcomes of step 550. In one example, packaged wafer-level lens 632 is bonded to an image sensor 680 to form a camera module 638. Image sensor 680 is an embodiment of image sensor 170. Camera module 638 is an embodiment of camera module 160. In another example, packaged lens array 640 is bonded to an image sensor array 685 to form an array camera module 648. Image sensor array 685 is an embodiment of image sensor array 190 and includes two image sensors. Array camera module 648 is an embodiment of array camera module 180.

Packaged wafer-level lens 632 includes wafer-level lens 110 and an opaque housing 634 formed from opaque housing material 622. Opaque housing 634 is an embodiment of housing 116. Opaque housing 634 contacts substrate 130 and surrounds wafer-level lens 110 in a radial direction (orthogonal to optical axis 636 of wafer-level lens 110). Opaque housing 634 thereby forms a light-tight enclosure with openings that allow light propagation through wafer-level lens 110. Opaque housing 634 covers the portion of substrate 130 that faces away from optical axis 636. Opaque housing 634 extends inwards from the perimeter of substrate 130 towards optical axis 636 along both (a) the surface of substrate 130, which holds lens element 121 and (b) the surface of substrate 130, which holds lens element 122. Packaged wafer-level lens 632 may be bonded to image sensor 680 in step 550 by bonding opaque housing 634 to image sensor 680.

Optionally, a layer 673 is located between opaque housing 634 and image sensor 680. In one implementation, layer 673 is an adhesive. The adhesive may include an epoxy, a double-sided adhesive tape, a transfer adhesive tape, or another adhesive known in the art. In another implementation, layer 673 includes an adhesive, such as those mentioned above, and an additional spacer.

As compared to prior art camera module 200 (FIG. 2), opaque housing 634 of packaged wafer-level lens 632 integrally forms equivalents of bottom spacer 230, top spacer 240, and black coating 250.

Packaged lens array 640 includes two wafer-level lenses 110 and an opaque housing 644 formed from opaque housing material 622. Opaque housing 644 is an embodiment of housing 118. Opaque housing 644 contacts each substrate 130 and surrounds each wafer-level lens 110 in a radial direction (orthogonal to optical axis 636). Opaque housing 644 thereby forms a light-tight enclosure with openings that allow light propagation through each wafer-level lens 110. Opaque housing 644 covers, for each wafer-level lens 110, the portion of substrate 130 that faces away from the associated optical axis 636. For each wafer-level lens 110, opaque housing 644 extends inwards from the perimeter of substrate 130 towards optical axis 636 along both (a) the surface that holds lens element 121 and (b) the surface that holds lens element 122. Packaged lens array 640 may be bonded to image sensor array 685 in step 550 by bonding opaque housing 644 to image sensor array 685, thus forming an embodiment of array camera module 180. Optionally, layer 673 is located between at least portions of opaque housing 644 and image sensor array 685. In one implementation, layer 673 is an adhesive, as discussed above, and is located between opaque housing 644 and image sensor array 685 along a peripheral path that surrounds image sensor array 685.

Without departing from the scope hereof, packaged lens array 640 may include more than two wafer-level lenses 110, for example four wafer-level lenses 110 arranged in a 2×2 array or three wafer-level lenses 110 arranged in a 1×3 array. Related hereto, image sensor array 685 is configured to match each wafer-level lens 110 of packaged lens array 640 with an image sensor.

As compared to prior art array camera module 300 (FIG. 3), opaque housing 644 integrally forms equivalents of bottom spacers 230, top spacers 240, and black coating 350. In addition, both of wafer-level lenses 110 are aligned in a single step, whereas the two wafer-level lenses 210 of prior art array camera module 300 are aligned separately. Hence, the alignment process and assembly process of method 500 is greatly simplified as compared to the prior art.

In an embodiment, step 510 includes a step 514 of using a mold with recesses for shaping spacers according to a pre-specified spacing between wafer-level lenses 110 and associated image sensors. In this embodiment, step 530 includes a step 534 of producing wafer 150 with the spacers. Diagram 610 and wafer 630 illustrate one example of this embodiment. Recesses 692 have depth 670. Depth 670 is measured relative to substrate 130 when wafer-level lenses 110 are placed in lower mold piece 612. Accordingly, wafer 630 includes spacers 672 having extent 670 in a direction along optical axis 636 away from substrate 130 on the side of substrate 130 associated with lens element 122. In one implementation, extent 670 matches a pre-specified spacing between packaged wafer-level lens 632 and image sensor 680 (or a pre-specified spacing between packaged lens array 640 and image sensor array 685) apart from any adhesive placed therebetween.

In an embodiment, step 510 includes a step 516 of using a mold with tapered recesses for shaping a tapered housing for each wafer-level lenses 110. In this embodiment, step 530 includes a step 536 of producing wafer 150 with a taper around each wafer-level lens 110.

Figure 7:
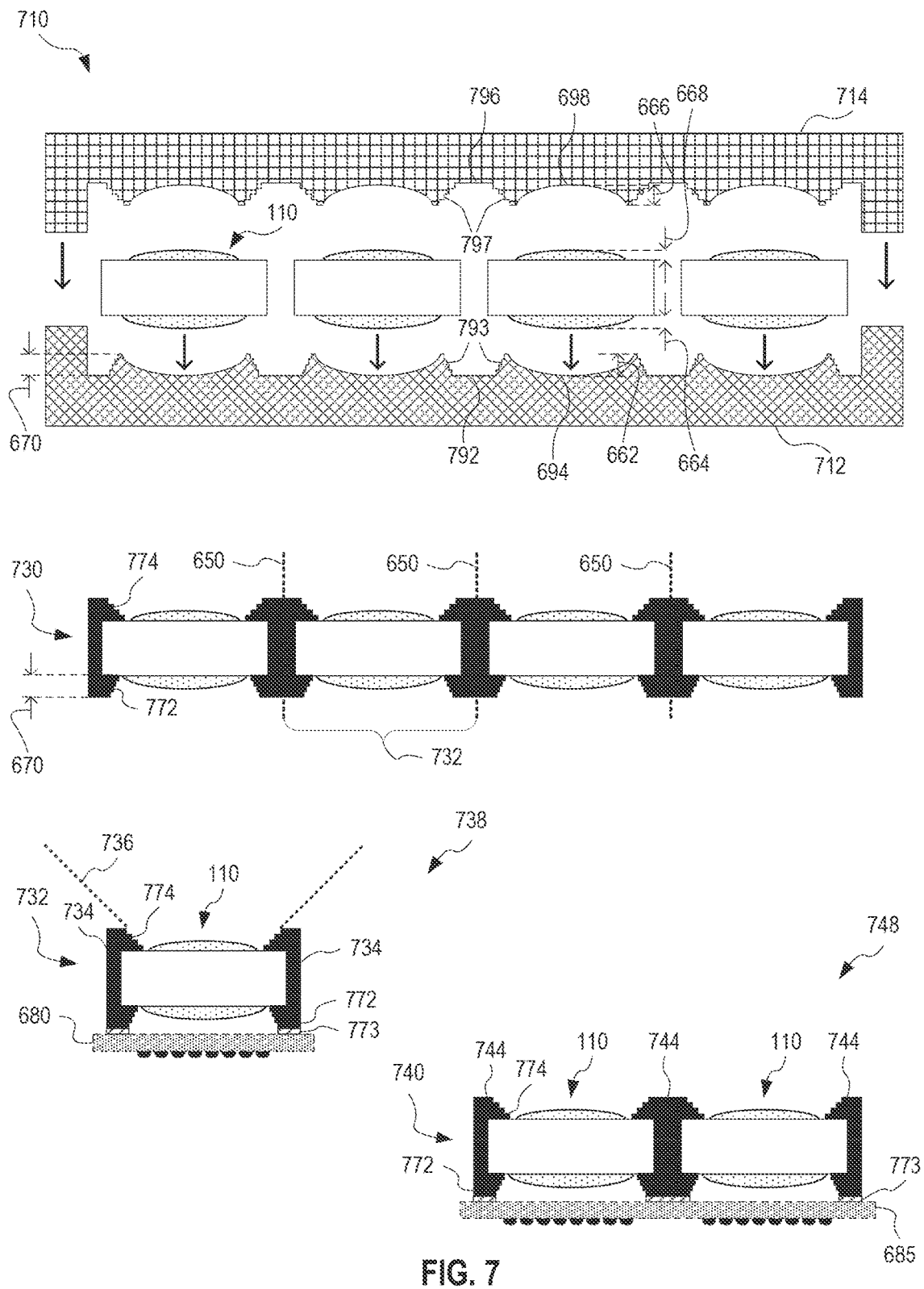
FIG. 7 schematically illustrates certain steps of the method of FIG. 5, as well as wafer-level lens assemblies and camera modules produced therefrom, according to another embodiment.

FIG. 7 schematically illustrates one example of method 500 (FIG. 5) when implemented with steps 516 and 536. FIG. 7 also shows one exemplary wafer 730 of packaged wafer-level lenses produced according to this example of method 500. Additionally, FIG. 7 shows exemplary wafer-level lens assemblies (packaged wafer-level lens 732 and packaged lens array 740), and camera modules (camera module 738 and array camera module 748) associated with this example of method 500. The embodiment of method 500 that includes steps 516 and 536 is best viewed together with FIG. 7.

Diagram 710 illustrates one example of step 516 based upon a lower mold piece 712 and an upper mold piece 714. Lower mold piece 712 is similar to lower mold piece 612, except that recesses 692 are replaced by recesses 792. Upper mold piece 714 is similar to upper mold piece 614, except that recesses 696 are replaced by recesses 796. Recesses 792 have a taper 793, and recesses 796 have a taper 797. Tapers 793 and 797 may be stepwise tapers, as shown in FIG. 7, or smooth tapers, without departing from the scope hereof.

Wafer 730 is one exemplary outcome of step 530 implemented with step 536 when using lower mold piece 712 and upper mold piece 714 in step 510. Tapers 793 produce a tapered spacer 772 around each wafer-level lens 110 on side of wafer-level lens 110 associated with lens element 122. As compared to wafer 630 (FIG. 6), spacers 672 are replaced by tapered spacers 772 shaped by tapers 793. Tapers 797 produce a taper 774 around each wafer-level lens 110 on the light-receiving side of wafer-level lens 110, i.e., the side associated with lens element 121. Taper 774 provides optimal acceptance of light propagating toward wafer-level lens 110 from within a field of view (indicated by field of view angle 736), while also providing optimal blocking of light propagating toward wafer-level lens 110 from outside this field of view. Tapers 797 may have any angle matching a pre-specified field of view angle 736.

Wafer 730 may be used in optional step 540 to produce a plurality of packaged wafer-level lenses 732 and/or a plurality of packaged lens arrays 740. Packaged wafer-level lens 732 is similar to packaged wafer-level lens 632 except for opaque housing 634 being replaced by opaque housing 734 having tapered spacer 772 and taper 774. Packaged lens array 740 is similar to packaged lens array 640 except for opaque housing 644 being replaced by housing 744. Housing 744 is similar to opaque housing 644 except for having tapered spacers 772 and tapers 774.

In optional step 550, at least one packaged wafer-level lens 732 is bonded to image sensor 680, as discussed in reference to FIG. 6, to form a camera module 738, and/or at least one packaged lens array 740 is bonded to image sensor array 685, as discussed in reference to FIG. 6, to form an array camera module 748. Camera module 738 is an embodiment of camera module 160, and array camera module 748 is an embodiment of array camera module 180.

In an embodiment, step 510 includes a step 518 of using a mold with recesses for shaping flanges. In this embodiment, step 530 includes a step 538 of producing wafer 150 with flanges. These flanges define the alignment of packaged wafer-level lenses 115 to image sensor 170, and/or define the alignment of array 117 with image sensor array 190.

Figure 8:
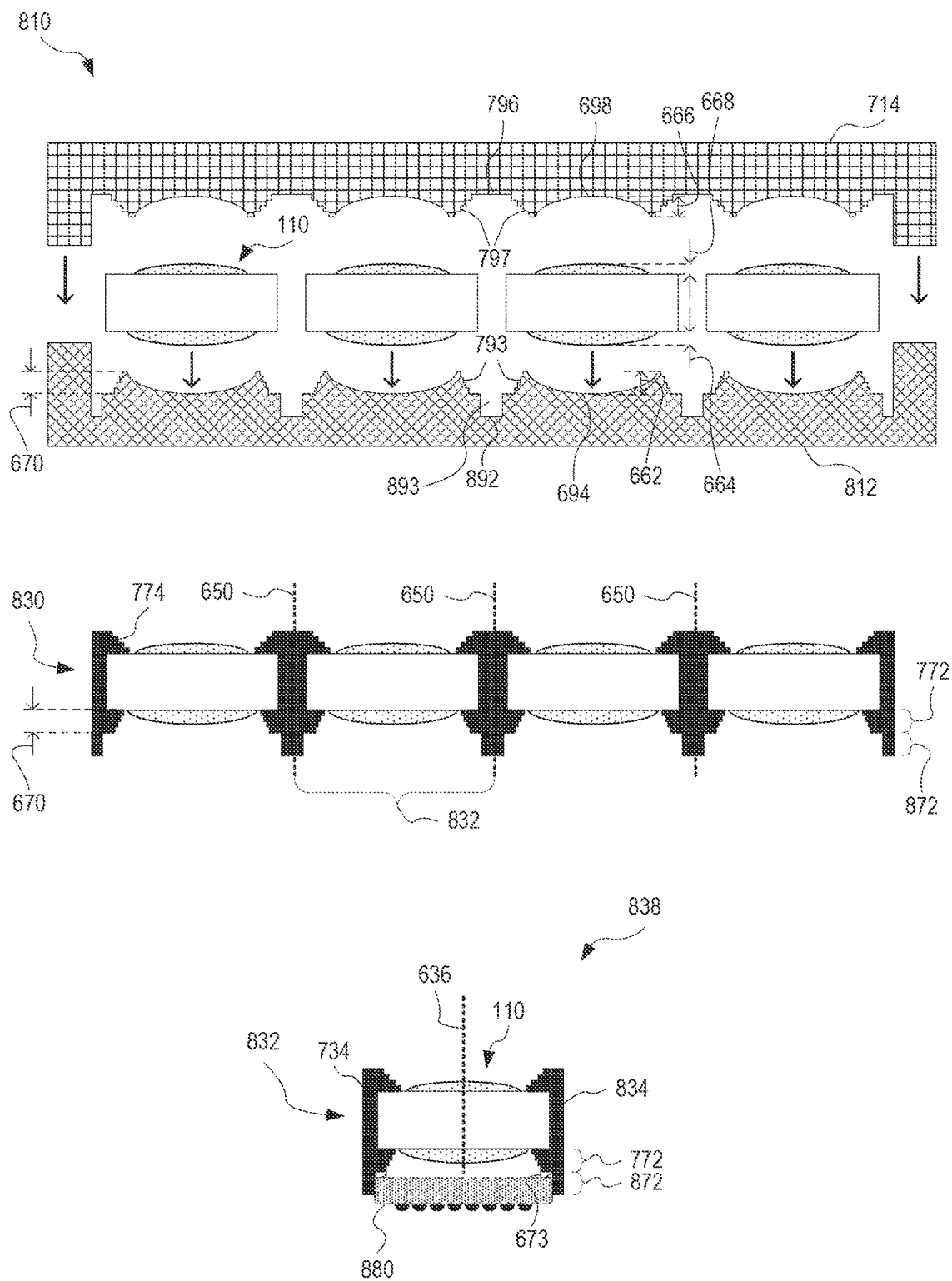
FIG. 8 schematically illustrates certain steps of the method of FIG. 5, as well as packaged wafer-level lenses and single-camera camera modules produced therefrom, according to yet another embodiment.

FIG. 8 illustrates one example of method 500 (FIG. 5), when implemented with steps 518 and 538, together with one exemplary wafer 830 of packed wafer-level lenses. FIG. 8 further shows one exemplary packaged wafer-level lens 832 and one exemplary camera module 838 produced by the example of method 500. The example illustrated in FIG. 8 is thus associated with an embodiment of method 500, which implements steps 518 and 538 and is tailored for production of (a) packaged wafer-level lenses having a single wafer-level lens, and (b) camera modules having a single camera. This embodiment of method 500 is best viewed together with FIG. 8.

Diagram 810 illustrates one example of step 518 based upon a lower mold piece 812 and upper mold piece 714 (FIG. 7). Lower mold piece 812 is similar to lower mold piece 712, except that recesses 792 are replaced by recesses 892. Recesses 892 have taper 793 and an additional inner recess 893 with depth greater than depth 670.

FIG. 8 shows one exemplary wafer 830 of packaged wafer-level lenses 832. Wafer 830 is one exemplary outcome of step 530 implemented with step 538 when using lower mold piece 812 in step 510 implemented with step 518. As compared to wafer 730 (FIG. 7), an additional flange 872 exists on tapered spacer 772. Thus, each wafer-level lens in wafer 830 is surrounded, on the side associated with lens element 122, by tapered spacer 772 and flange 872.

Wafer 830 may be used in optional step 540, implemented with step 422 (FIG. 4), to produce a plurality of packaged wafer-level lenses 832. Packaged wafer-level lens 832 is similar to packaged wafer-level lens 732 except for opaque housing 734 being replaced by opaque housing 834. Opaque housing 834 is similar to opaque housing 734 except for also including flange 872.

In optional step 550, implemented with step 432, at least one packaged wafer-level lens 832 is bonded to an image sensor 880 to form an embodiment of camera module 160. Flange 872 contacts, or nearly contacts, the sides of image sensor 880 to define the alignment of packaged wafer-level lens 832 with respect to image sensor 880. Tapered spacer 772 defines the spacing between image sensor 880 and wafer-level lens 110 (apart from optional layer 673), while flange 872 defines the positioning of wafer-level lens 110 in dimensions orthogonal to optical axis 636. Accordingly, flange 872 eliminates an active alignment step required when assembling prior art camera module 200 (FIG. 2).

Figure 9:
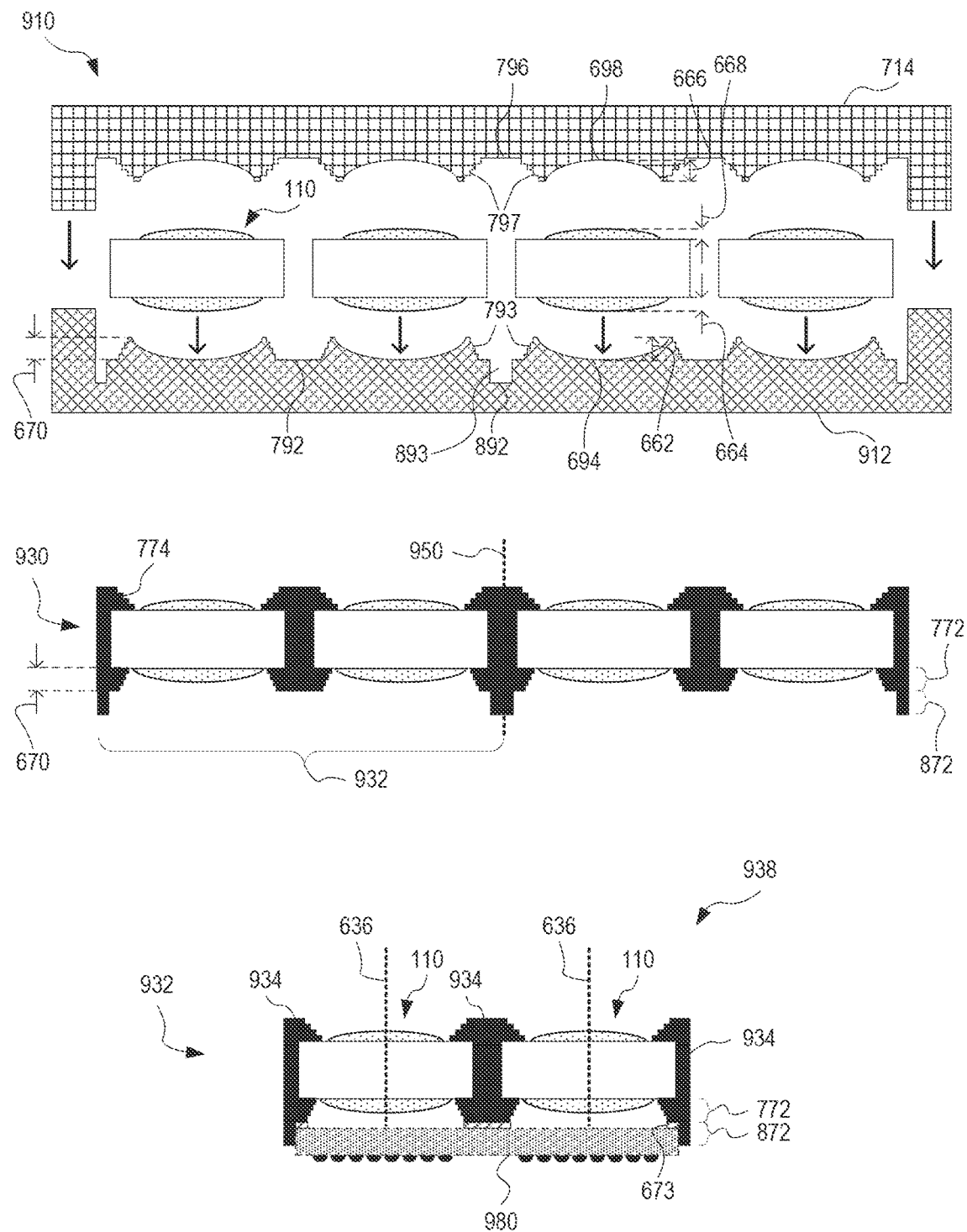
FIG. 9 schematically illustrates certain steps of the method of FIG. 5, as well as packaged lens arrays and array camera modules produced therefrom, according to a further embodiment.

FIG. 9 illustrates another example of method 500 (FIG. 5), when implemented with steps 518 and 538, together with one exemplary wafer 930 of packed wafer-level lenses. FIG. 9 further shows one exemplary packaged lens array 932 and one exemplary array camera module 938 produced by this example of method 500. The example illustrated in FIG. 8 is thus associated with an embodiment of method 500, which implements steps 518 and 538 and is tailored for production of packaged lens arrays and array camera modules. This embodiment of method 500 is best viewed together with FIG. 9.

Diagram 910 illustrates one example of step 518 based upon a lower mold piece 912 and upper mold piece 714 (FIG. 7). Lower mold piece 912 combines the properties of lower mold piece 712 and lower mold piece 812 to include both recesses 792 and recesses 892.

FIG. 9 shows one exemplary wafer 930 of packaged lens arrays 932. Wafer 930 is one exemplary outcome of step 530 implemented with step 538 when using lower mold piece 912 in step 510. As compared to wafer 830 (FIG. 7), the additional flange 872 exists on tapered spacer 772 in some locations, while other locations have tapered spacer 772 without flange 872.

Wafer 930 may be used in optional step 540, implemented with step 424 (FIG. 4), to produce a plurality of packaged lens arrays 932. In optional step 540, wafer 930 is diced along dicing lines 950 that coincide with locations having flanges 872, such that each packaged lens array 932 has flange 872 along its perimeter.

In optional step 550, implemented with step 434, at least one packaged lens array 932 is bonded to an image sensor array 980 to form an embodiment of array camera module 180. Flange 872 contacts, or nearly contacts, the sides of image sensor array 980 to define the alignment of packaged lens array 932 with respect to image sensor array 980. Tapered spacer 772 defines the spacing between image sensor 880 and wafer-level lens 110 (apart from optional layer 673), and provides light-blockage between individual cameras of the array camera module formed by packaged lens array 932 and image sensor array 980. Flange 872 defines the positioning of wafer-level lenses 110 in dimensions orthogonal to optical axis 636. Accordingly, flange 872 eliminates an active alignment step required when assembling prior art camera module 200 (FIG. 2).

In the example shown in FIG. 9, recesses 892 and dicing lines 950 are arranged to produce a plurality of packaged lens array 932 each having two wafer-level lenses 110. However, recesses 892 and dicing lines 950 may be arranged such that step 540 produces a plurality of packaged lens array 932, at least some of which each having more than two wafer-level lenses 110, without departing from the scope hereof. Furthermore, recesses 892 and dicing lines 950 may be arranged such that step 540 produces a combination of wafer-level lens assemblies including at least one packaged wafer-level lens 832 and at least one packaged lens array 932. It is understood that such wafer-level lens assemblies may be bonded, in step 550, to image sensor modules with the corresponding number and configuration of image sensors.

Without departing from the scope hereof, method 500 may be performed to produce a wafer of packaged wafer-level lenses that combines features of wafers 630, 730, 830, and 930. In one example, step 510 produces a wafer that may be diced in step 540 to produce at least two different wafer-level lens assemblies selected from the group consisting of packaged wafer-level lens 632, packaged lens array 640, packaged wafer-level lens 732, packaged lens array 740, packaged wafer-level lens 832, and packaged lens array 932. In another example, step 510 produces a wafer that may be diced in step 540 to produce one or more wafer-level lens assemblies, each combining features of packaged wafer-level lens 632, packaged lens array 640, packaged wafer-level lens 732, packaged lens array 740, packaged wafer-level lens 832, and packaged lens array 932. For example, non-tapered spacers may be combined with flanges, and/or non-tapered spacers may be combined with tapered spacers.

Combinations of Features

Features described above as well as those claimed below may be combined in various ways without departing from the scope hereof. For example, it will be appreciated that aspects of one wafer-level lens packaging method, or associated lens assembly or camera module, described herein may incorporate or swap features of another wafer-level lens packaging method, or associated lens assembly or camera module, described herein. The following examples illustrate possible, non-limiting combinations of embodiments described above. It should be clear that many other changes and modifications may be made to the methods and device herein without departing from the spirit and scope of this invention:

(A1) A method for packaging wafer-level lenses may apply to a plurality of wafer-level lenses, each having (a) a substrate with opposite facing first and second surfaces and (b) a respective lens element on at least one of the first and second surfaces, each lens element having a lens surface facing away from the substrate.

(A2) The method denoted as (A1) may include partially encasing the plurality of wafer-level lenses with a housing material to produce a wafer of packaged wafer-level lenses.

(A3) In the method denoted as (A2), the housing material may support each of the plurality of wafer-level lenses by contacting the respective substrate.

(A4) In the method denoted as (A3), the housing may be shaped to form, within the wafer of packaged wafer-level lenses, a plurality of housings for the plurality of wafer-level lenses, respectively.

(A5) In the method denoted as (A4), each of the housings having openings for allowing light propagation through the plurality of wafer-level lenses, respectively.

(A6) In each of the methods denoted as (A2) through (A5), the step of partially encasing may include shaping the housing material such that each of the housings extends inwards toward optical axis of the wafer-level lens along both the first surface and the second surface.

(A7) In each of the methods denoted as (A2) through (A6), the housing material may be opaque to prevent leakage of external light through the housing material into optical path associated with each of the wafer-level lenses.

(A8) In each of the methods denoted as (A2) through (A7), the step of partially encasing may include (a) disposing the plurality of wafer-level lenses in a mold, (b) injecting the housing material into the mold, and (c) forming the wafer of packaged wafer-level lenses by hardening the housing material in the mold.

(A9) In the method denoted as (A8), the mold may include first recesses for forming the plurality of housings through the steps of disposing, injecting, and molding.

(A10) In the method denoted as (A9), the mold may further include second recesses having depth in excess of protrusion depth into the mold of a lens surface associated with the individual second recesses, to prevent deposition of the housing material on the lens surface.

(A11) Each of the methods denoted as (A2) through (A10) may further include dicing the wafer of packaged wafer-level lenses to form a plurality of packaged wafer-level lens assemblies, each including at least one of the wafer-level lenses.

(A12) The method denoted as (A11) may further include bonding at least one of the plurality of packaged wafer-level lens assemblies to an image sensor module to form an optical assembly.

(A13) In the method denoted as (A12), the step of bonding may include bonding the housing material to the image sensor module.

(A14) In each of the methods denoted as (A2) through (A13), the step of partially encasing may include shaping the wafer of packaged wafer-level lenses such that a portion of the housing material forms spacers facing away from the first surface.

(A15) In the method denoted as (A14), the spacers may have extent, in direction along optical axis of the wafer-level lenses, according to pre-specified spacing between (a) each of the wafer-level lenses and a (b) a respective image sensor module separate from the wafer of packaged wafer-level lenses.

(A16) The method denoted as (A15) may further include dicing the wafer of packaged wafer-level lenses to produce a plurality of packaged wafer-level lens assemblies, wherein each wafer-level lens assembly includes at least one of the wafer-level lenses and at least one of the spacers.

(A17) The method denoted as (A16) may further include mounting at least one of the packaged wafer-level assemblies onto the respective image sensor module, at the pre-specified spacing, using the at least one of the spacers.

(A18) In the method denoted as (A17), the step of shaping may include shaping the housing material such that each one of the wafer-level lenses is associated with an enclosure of optical path of the one of the wafer-level lenses along the first extent, wherein the enclosure is formed by the spacers.

(A19) In the method denoted as (A18), the step of dicing may include dicing the wafer of packaged wafer-level lenses to produce the packaged wafer-level lens assemblies, each including exactly one of the wafer-level lenses and exactly one of the spacers.

(A20) In the method denoted as (A19), the housing material may be opaque such that, for each of the at least one of the packaged wafer-level assemblies, the one of the spacers prevents leakage of external light into optical path associated with the one of the wafer-level lenses.

(A21) In the method denoted as (A18), the step of dicing may include dicing the wafer of packaged wafer-level lenses such that the at least one of the packaged wafer-level lens assemblies, referred to in the step of mounting, includes N of the wafer-level lenses and enclosures associated with the N of the wafer-level lenses, wherein N is an integer greater than one.

(A22) In the method denoted as (A21), in the step of mounting, the respective image sensor module may have N image sensors.

(A23) In the method denoted as (A22), the step of mounting may include bonding the one of the at least one of the packaged wafer-level lens assemblies onto the respective image sensor module to form at least a portion of an array camera.

(A24) In the method denoted as (A23), the housing material may be opaque to prevent light leakage between individual cameras of the array camera.

(A25) In each of the methods denoted as (A2) through (A24), the step of partially encasing may include shaping the wafer of packaged wafer-level lenses such that a portion of the housing material forms flanges, facing away from the first surface, for mounting at least some of the wafer-level lenses onto a respective image sensor module separate from the wafer of packaged wafer-level lenses.

(A26) The method denoted as (A25) may further include dicing the wafer of packaged wafer-level lenses to produce a plurality of packaged wafer-level lens assemblies, each including at least one of the wafer-level lenses and at least one of the flanges.

(A27) The method denoted as (A26) may further include mounting, for at least one of the packaged wafer-level lens assemblies, a respective one of the flanges onto perimeter of the respective image sensor module.

(A28) In the method denoted as (A27), the step of dicing may include dicing the wafer of packaged wafer-level lenses such that the at least one of the packaged wafer-level lens assemblies, referred to in the step of mounting, includes N of the wafer-level lenses and a portion of the flanges, wherein N is an integer greater than one.

(A29) In the method denoted as (A28), the step of forming flanges may include producing, for the at least one of the packaged wafer-level lens assemblies a peripheral flange describing a peripheral path circumnavigating the N of the wafer-level lenses, collectively, in a plane orthogonal to optical axes of the N of the wafer-level lenses.

(A30) In the method denoted as (A29), the step of dicing may include dicing the wafer of packaged wafer-level lenses such that the at least one of the packaged wafer-level lens assemblies includes N of the wafer-level lenses and the peripheral flange.

(A31) In the method denoted as (A30), in the step of mounting, the respective image sensor module may have N image sensors.

(A32) In the method denoted as (A31), the step of mounting may include, for each one of the at least one of the packaged wafer-level lens assemblies, bonding the peripheral flange onto the respective image sensor module to form an array camera.

(A33) In the method denoted as (A32), the housing material may be opaque such that the peripheral flange prevents leakage of external light through the housing material into optical paths associated with the N of the wafer-level lenses.

(A34) In the method denoted as (A33), the step of shaping the wafer may further include, for each of the at least one of the packaged wafer-level lens assemblies, forming at least one spacer facing away from the first surface.

(A35) In the method denoted as (A34), each of the at least one spacer may have extent, in direction along optical axis of the N of the wafer-level lenses, according to pre-specified spacing between (a) the N of the wafer-level lenses and (b) the respective image sensor module, the at least one spacer being configured to prevent light leakage between individual cameras of the array camera.

(B1) A lens assembly may include a wafer-level lens with (a) a substrate with opposite facing first and second surfaces and (b) a respective lens element on at least one of the first and second surfaces, wherein each lens element has a lens surface facing away from the substrate.

(B2) The lens assembly denoted as (B1) may further include an integrally formed housing contacting the substrate and extending inwards toward optical axis of the wafer-level lens along both the first surface and the second surface.

(B3) In the lens assembly denoted as (B2), the integrally formed housing may be opaque.

(B4) In the lens assembly denoted as (B3), the integrally formed housing may circumnavigate the wafer-level lens in dimensions orthogonal to the optical axis.

(B5) Each of the lens assemblies denoted as (B2) through (B4) may be manufactured using one or more of the methods denoted as (A2) through (A35).

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and systems, which, as a matter of language, might be said to fall therebetween.

What is claimed is:

1. A method for packaging a plurality of wafer-level lenses, each wafer-level lens including (a) a substrate with opposite facing first and second surfaces and (b) a respective lens element on at least one of the first and second surfaces, each lens element having a lens surface facing away from the substrate, the method comprising:
    disposing the plurality of wafer-level lenses in a mold; and
    after the step of disposing, molding, inside the mold, a housing material around the plurality of wafer-level lenses to partially encase the plurality of wafer-level lenses with the housing material to produce a wafer of packaged wafer-level lenses, the housing material forming a single integrally formed structure that, when the wafer of packaged wafer-level lenses is removed from the mold, supports each of the plurality of wafer-level lenses, such that for each of the plurality of wafer-level lenses, the housing material (a) fully covers sides of the substrate facing away from optical axis of the wafer-level lens, each of the first and the second surfaces bisecting the optical axis, and (b) extends inwards toward the optical axis along both of the first and second surfaces, so as to form, within the wafer of packaged wafer-level lenses, a plurality of housings for the plurality of wafer-level lenses, respectively.

2. The method of claim 1, each of the housings having openings for allowing light propagation through the plurality of wafer-level lenses, respectively.

3. The method of claim 1, the housing material being opaque to prevent leakage of external light through the housing material into optical path associated with each of the wafer-level lenses.

4. The method of claim 1, the step of molding comprising:
    injecting the housing material into the mold; and
    forming the single integrally formed structure by hardening the housing material in the mold.

5. The wafer-level method of claim 4, the mold comprising first recesses for forming the plurality of housings through the steps of disposing, injecting, and forming.

6. The wafer-level method of claim 5, the mold further comprising second recesses having depth in excess of protrusion depth into the mold of the lens elements on each of the first and second surfaces, to prevent deposition of the housing material on the lens elements.

7. The method of claim 1, further comprising:
    dicing the single integrally formed structure to form a plurality of packaged wafer-level lens assemblies, each including at least one of the wafer-level lenses; and
    bonding at least one of the plurality of packaged wafer-level lens assemblies to an image sensor module to form an optical assembly.

8. The method of claim 7, the step of bonding comprising bonding the housing material to the image sensor module.

9. The wafer-level method of claim 1, the step of molding comprising:
    shaping the wafer of packaged wafer-level lenses such that a portion of the housing material forms spacers facing away from the first surface, the spacers having extent, in direction along optical axis of the wafer-level lenses, according to pre-specified spacing between (a) each of the wafer-level lenses and (b) a respective image sensor module separate from the wafer of packaged wafer-level lenses.

10. The wafer-level method of claim 9, further comprising:
    dicing the single integrally formed structure to produce a plurality of packaged wafer-level lens assemblies, each including at least one of the wafer-level lenses and at least one of the spacers; and
    mounting at least one of the packaged wafer-level assemblies onto the respective image sensor module, at the pre-specified spacing, using the at least one of the spacers.

11. The wafer-level method of claim 10,
    the step of shaping comprising shaping the housing material such that each one of the wafer-level lenses is associated with an enclosure of optical path of the one of the wafer-level lenses along the first extent, the enclosure being formed by the spacers;

the step of dicing comprising dicing the single integrally formed structure to produce the packaged wafer-level lens assemblies, each including exactly one of the wafer-level lenses and exactly one of the spacers; and the housing material being opaque such that, for each of the at least one of the packaged wafer-level assemblies, the one of the spacers prevents leakage of external light into optical path associated with the one of the wafer-level lenses.

12. The wafer-level method of claim 10, the step of shaping comprising shaping the housing material such that each one of the wafer-level lenses is associated with an enclosure of optical path of the one of the wafer-level lenses along the first extent, the enclosure being formed by the spacers;

the step of dicing comprising dicing the single integrally formed structure such that the at least one of the packaged wafer-level lens assemblies, referred to in the step of mounting, includes N of the wafer-level lenses and enclosures associated with the N of the wafer-level lenses, wherein N is an integer greater than one;

in the step of mounting, the respective image sensor module having N image sensors; and the step of mounting comprising bonding the one of the at least one of the packaged wafer-level lens assemblies onto the respective image sensor module to form at least a portion of an array camera.

13. The method of claim 12, the housing material being opaque to prevent light leakage between individual cameras of the array camera.

14. The wafer-level method of claim 1, the step of molding comprising:

shaping the wafer of packaged wafer-level lenses such that a portion of the housing material forms flanges extending away from the first surface, the flanges having (i) a bottom surface farthest from the first surface and (ii) a shelf recessed from the bottom surface, for mounting at least some of the wafer-level lenses onto a respective image sensor module separate from the wafer of packaged wafer-level lenses.

15. The wafer-level method of claim 14, further comprising:

dicing the single integrally formed structure to produce a plurality of packaged wafer-level lens assemblies, each including at least one of the wafer-level lenses and at least one of the flanges; and mounting, for at least one of the packaged wafer-level lens assemblies, a respective one of the flanges onto perimeter of the respective image sensor module.

16. The wafer-level method of claim 15, the step of forming flanges comprising producing, for the at least one of the packaged wafer-level lens assemblies, a peripheral flange describing a peripheral path circumnavigating N of the wafer-level lenses, collectively, in a plane orthogonal to optical axes of the N of the wafer-level lenses, N being an integer greater than one, the peripheral flange extending farther from the wafer-level lenses, in one direction parallel to the optical axis, than any other portion of the housing material circumnavigated by the peripheral path;

the step of dicing comprising dicing the single integrally formed structure such that the at least one of the packaged wafer-level lens assemblies includes N of the wafer-level lenses and the peripheral flange;

in the step of mounting, the respective image sensor module having N image sensors; and the step of mounting comprising, for each one of the at least one of the packaged wafer-level lens assemblies, bonding the peripheral flange onto the respective image sensor module to form an array camera.

17. The method of claim 16, the housing material being opaque such that the peripheral flange prevents leakage of external light through the housing material into optical paths associated with the N of the wafer-level lenses; and the step of shaping the wafer further comprising, for each of the at least one of the packaged wafer-level lens assemblies, forming at least one spacer facing away from the first surface, each of the at least one spacer having extent, in direction along optical axis of the N of the wafer-level lenses, according to pre-specified spacing between (a) the N of the wafer-level lenses and (b) the respective image sensor module, the at least one spacer being configured to prevent light leakage between individual cameras of the array camera.

18. The method of claim 1, the substrate of each of the plurality of wafer-level lenses being a respective one of a plurality of substrates, the step of molding producing a wafer of packaged wafer-level lenses such that for each of the plurality of wafer-level lenses, the housing material fully covers sides of its respective one of the plurality of substrates facing away from optical axis of the wafer-level lens.

19. A lens assembly comprising:

a wafer-level lens including (a) a substrate with opposite facing first and second surfaces each of the first and the second surfaces bisecting optical axis of the wafer-level lens, and (b) a respective lens element on at least one of the first and second surfaces, each lens element having a lens surface facing away from the substrate; and an integrally formed housing contacting and partially encapsulating the substrate, the integrally formed housing forming a single uniform and continuous structure that (a) fully covers sides of the substrate facing away from the optical axis, and (b) extends inwards toward the optical axis along both the first surface and the second surface.

20. The lens assembly of claim 19, the integrally formed housing being opaque.

21. The lens assembly of claim 19, the single uniform and continuous structure including a flange extending away from the first surface, the flange having (i) a bottom surface farthest from the first surface and (ii) a shelf recessed from the bottom surface.

22. The lens assembly of claim 19, comprising N instances of the wafer-level lens, N being an integer greater than one, the optical axis of the instances being parallel to each other, the instances being disposed in a plane orthogonal to the optical axes of the instances, the single uniform and continuous structure (a) fully covering sides of the substrate, of each of the instances, facing away from the respective optical axis, (b) extending inwards toward the optical axis, of each of the instances, along both the respective first surface and the second surface, and (c) including a peripheral flange describing a peripheral path circumnavigating the multiple instances, collectively, in a plane orthogonal to optical axes of the instances, the peripheral flange extending farther from the instances, in one direction parallel to the optical axes, than any other portion of the single uniform and continuous structure circumnavigated by the peripheral path.

* * * * *